April 26, 1938.  I. RUDERMAN  2,115,285

METHOD AND APPARATUS FOR SUSTAINING AND LIFTING AIRCRAFT

Filed July 10, 1935  3 Sheets-Sheet 1

INVENTOR.
ISADORE RUDERMAN
BY George B. White
ATTORNEY.

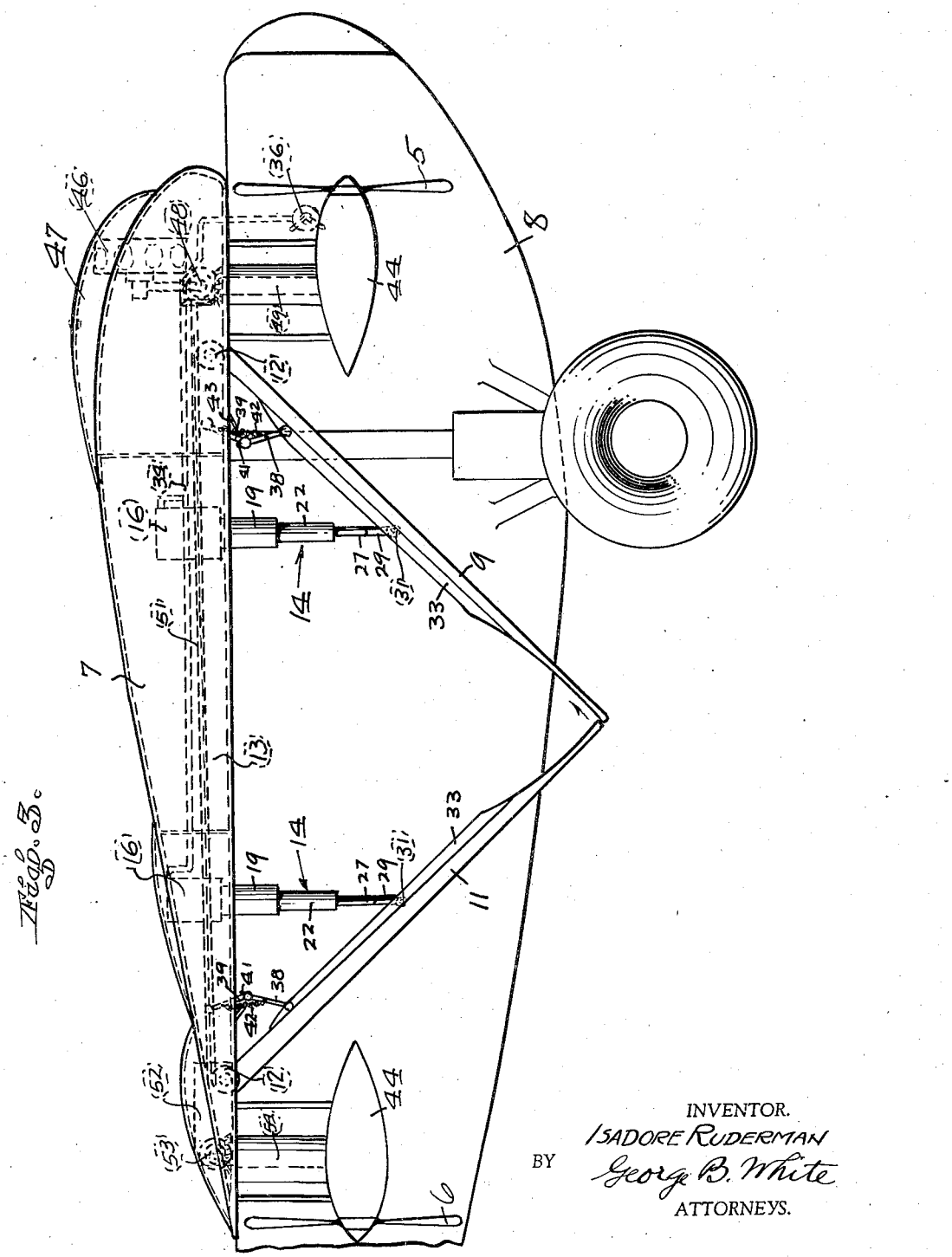

April 26, 1938.  I. RUDERMAN  2,115,285
METHOD AND APPARATUS FOR SUSTAINING AND LIFTING AIRCRAFT
Filed July 10, 1935  3 Sheets-Sheet 3
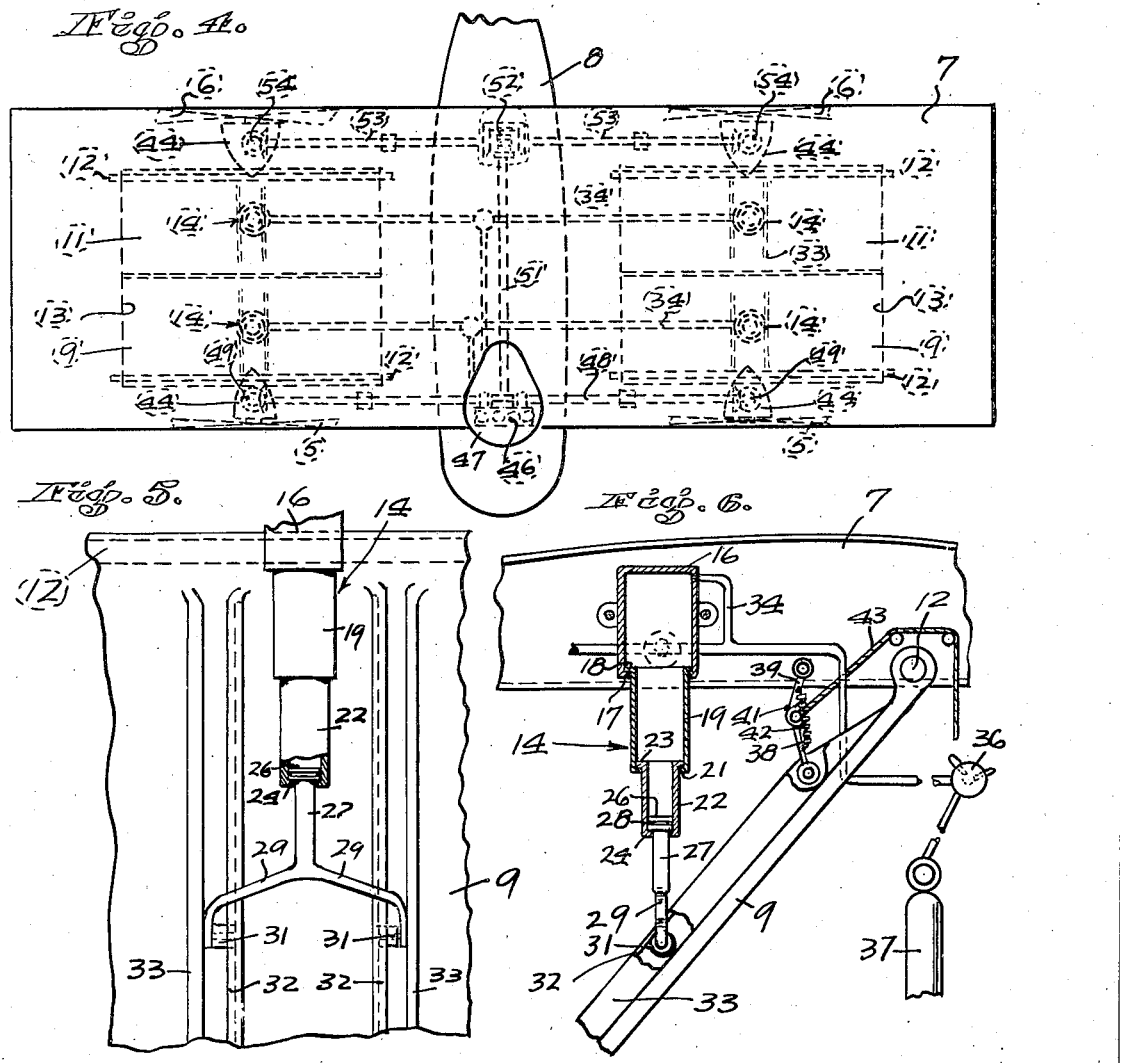
INVENTOR.
ISADORE RUDERMAN
BY George B. White
ATTORNEYS.

Patented Apr. 26, 1938

2,115,285

UNITED STATES PATENT OFFICE 2,115,285

METHOD AND APPARATUS FOR SUSTAINING AND LIFTING AIRCRAFT

Isadore Ruderman, San Francisco, Calif.

Application July 10, 1935, Serial No. 30,615

17 Claims. (Cl. 244—12)

This invention relates to aircrafts and particularly to auxiliary lift for aircrafts.

An object of the invention is to provide an aircraft with propellers so arranged relatively to adjustable surfaces on the aircraft as to accomplish the lifting and lowering of the aircraft at low speed and practically without forward motion, thereby providing an aircraft which can be readily adapted for commercial and general purposes and which can take off or land on limited area.

Another object of the invention is to provide a method for a practical vertical rising and lowering of an aircraft by means of aligned propellers working in opposite directions on downwardly converging surfaces between the propellers arranged at such angle that the vertical component of the force exerted by the respective propellers against the same lifts or supports the weight of the aircraft.

A further object of the invention is to provide propelling and lifting means for aircrafts by utilizing aligned propellers adapted to work selectively in opposite and in the same directions, and lifting surfaces arranged at suitable angles between the propellers, said surfaces being adjustable to an out of way position so as to obviate undue drag when the propellers work together for forward propelling of the aircraft.

Another object of the invention is to provide an arrangement of propellers and adjustable surfaces in such relation as to be used efficiently both for landing and taking off as well as forward flight of an aircraft without interfering with the respective attitudes of the aircraft.

Another object of the invention is to provide selective and controlled drive for the propellers coacting with angular surfaces and efficient means to move and to hold said surfaces in various operative positions.

I am aware that some changes may be made in the general arrangements and combinations of the several devices and parts, as well as in the details of the construction thereof without departing from the scope of the present invention as set forth in the foregoing specification, and as defined in the following claims; hence I do not limit my invention to the exact arrangements and combinations of the said device and parts as described in the said specification, nor do I confine myself to the exact details of the construction of the said parts as illustrated in the accompanying drawings.

The invention is clearly illustrated in the accompanying drawings, wherein

Figure 3 is a fragmental, side view of an airplane showing the lifting surfaces lowered.

Figure 4 is a fragmental plan view of an airplane illustrating the arrangement of the various elements of my invention.

Figure 5 is a fragmental front view of one of the lifting surfaces, showing the telescoping, hydraulic, adjusting mechanism therefor.

Figure 6 is a fragmental side view of a wing showing the hydraulic adjusting mechanism in section and also the diagrammatic arrangement of its valve control.

Figure 1:
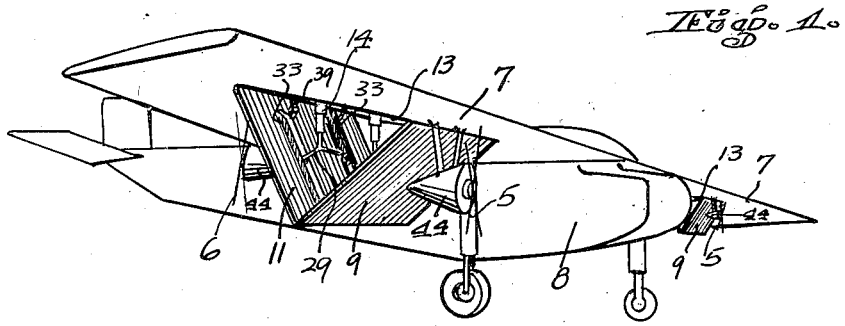
Figure 1 is a perspective view of an airplane with the lifting surfaces in operative position.

While in the herein illustration I show my method and device in connection with an airplane, it is to be understood, that the same may be used on all other types of suitable aircrafts.

My method of flying an aircraft consists of the working oppositely of opposed, spaced propellers so as to drive air against inclined lifting surfaces between the propellers so as to lift or support the aircraft on which the propellers and said surfaces are mounted.

In order to attain forward speed of the aircraft gradually after the aircraft reached a desired altitude first the rear propellers are slowed down while the forward propellers work at full speed. As the aircraft gains sufficient forward speed to support it in the air then the rotation of the rear propellers is completely reversed to act in the same direction as the forward propellers thereby to propel the aircraft forward, meanwhile the surfaces are withdrawn to an out of way position to allow advancement of the aircraft as in usual flight.

In carrying out my invention structurally I make use of a pair of spaced propellers 5 and 6 mounted substantially in tandem on the wing 7 of an airplane 8 and a pair of inclined panels 9 and 11 between the respective propellers 5 and 6 so arranged that the propellers 5 blow air against the respective panels 9 and the propellers 6 blow air against the respective panels 11. The panels 9 and 11 are inclined at approximately 45° angles to the direction of the respective airflow and extend below the lower tips of the propellers. The propeller tips are spaced at a very slight clearance below the lower surface of the wing 7.

The inclined panels 9 and 11 converge downwardly to an edge so as to prevent back flow of air into the space inclosed between the panels below the wing 7. The upper edges of the panels 9 and 11 are fulcrumed on pivot shafts 12 suitably mounted within the wing 7. The wing or wings 7, as the case may be, has recesses 13 on its lower faces to accommodate the panels 9 and 11 in folded position. It is to be noted that the panels 9 and 11 fold toward each other. The rear panel 11 folds below the front panel 9 so that when folded the panels 9 complement the lower surface of the wing 7 and do not create additional drag in forward flight. Normally the air-pressure in flight holds the panels in folded position but any suitable releasable catch may be provided for added security.

Any suitable control mechanism may be employed for the folding and unfolding of the panels 9 and 11. In this illustration I show a telescoping hydraulic plunger 14 for each panel 9 or 11. Each plunger being of the same structure description of one will suffice. Each plunger 14 consists of a housing 16 secured on the wing 7 having an open bottom with a flange 17 on which is supported the top flange 18 of a tubular plunger section 19 which latter also has an inwardly extended flange 21 at its lower end. Another plunger section 22 has an external flange 23 on its top which rests on the flange 21, and an inwardly extended flange 24 at its lower end which in turn supports the head 26 of a solid plunger 27.

The respective flanges are provided with suitable packings, and the head 26 is provided with usual piston rings 28 to prevent leakage. The lower end of the solid plunger 27 is forked into inclined branches 29 which have rollers 31 on their ends. The rollers 31 ride in grooved and flanged rails 32 formed on ribs 33 on the underside of each panel 9 or 11. There are two ribs 33 on each panel.

Pressure medium such as gas or compressed air is admitted into the housing 16 near its top through a conduit 34 which is controlled by a suitable valve 36 whereby it is communicated to a compressed air or gas tank 37.

As pressure medium is admitted into the housing 16 it acts on the plunger head 26 and extends the telescoping plunger sections so as to push the respective panels 9 or 11 out of the recess 13 and into operative positions. It is to be noted that there is separate piping for the set of rear plungers and the set of front plungers, so as to allow separate action of the front plungers first when unfolding, and the rear plungers first when collapsing or folding the panels 9 or 11, thus permitting the movement of the panels 11 along the inner surface of the respective panels 9. Folding of the panels 9 and 11 is cushioned by the pressure medium remaining in the plungers and the valve 36 is provided with a limited bypass to restrict the escape of the pressure medium from the housing 16.

For additional safety and to prevent the slamming of the panels 9 and 11 in case the pressure in the plungers fails, I provide toggle links 38 and 39 the former being fulcrumed on a rib of the respective panel 9 or 11, and the other on a rib of the adjacent wing 7. The links 38 and 39 are pivoted to each other and are provided with a stop 41 or other suitable means to prevent backward folding of the links when swung over center by a usual coil spring 42 which has its ends attached to the respective links 38 and 39. In this manner the panels 9 and 11 are rigidly held in unfolded position. Before folding or collapsing the panels 9 and 11 the operator pulls a suitable line 43 connected to the center fulcrum of the toggle so as to pull the toggle to foldable angle and thus allow the folding of the panels.

The propellers 5 and 6 may be driven in any suitable manner except that the rear propellers are reversible and their speed is controllable independently of the front propellers 5. Each propeller is supported on a usual casing 44 which may house separately controlled electric motors, or separate engines, or gear transmissions, as the case may be. In this illustration I show all propellers driven by a single power plant in the form of an engine 46 in a stream lined cowling 47 on the top of the center of the wing 7 controlled in the usual way from the fuselage. The engine through the usual gear transmission drives a transverse shaft 48 which is journaled in the wing 7 near the leading edge of said wing. The shaft 48 through suitable gearing transmits power to a vertical shaft 49 at each end thereof. The shafts 49 extend downwardly into the respective casings 44 and transmit rotation to the respective propellers 5 through suitable gearing in the casings 44.

The engine 46 also drives a rearwardly extended shaft 51 which latter rotates a shiftable gear transmission mechanism 52 near the trailing edge of the wing 7. Rotation is transmitted by the mechanism 52 to oppositely extended rear shafts 53, which latter through gears transmit rotation to rear vertical shafts 54 to drive through a suitable gearing in the rear casings 44 the rear propellers 6. Thus a suitable shifting mechanism controlled from the control cabin can change the speed or reverse the rotation of the rear propellers 6.

In operation before take off the pilot turns the valve 36 so as to simultaneously actuate the forward plungers and unfold the panels 9 on both sides of the wing 7, then the valve 36 is turned further so as to simultaneously actuate the rear plungers and unfold the rear panels 11. Then the propellers 5 and 6 are operated to blow air toward the respective panels 9 and 11. The blast of air creates a lifting pressure on the panels 9 and 11 as well as on the underside of the wing 7 and experiments show that it creates sufficient pressure to lift the airplane. After the airplane reaches a desired altitude the operator shifts the gear transmission 52 into slow speed. As the airplane begins to obtain forward momentum, the lines 43 of the rear panels 11 are pulled and the valve 36 is turned to by pass to allow the gradual folding of the panels 11 into the recess 13. As the panels 11 are partly turned then the panels 9 are similarly folded over the panels 11. The pressure under the wing 9 assists in urging the panels 9 and 11 into the recess 13. While the panels 9 and 11 are folded, the gear transmission 52 is shifted into reverse so that the rear propellers 6 operate as pushers to coact with the front propellers 5 to propel the airplane forward at a suitable speed.

Figure 2:
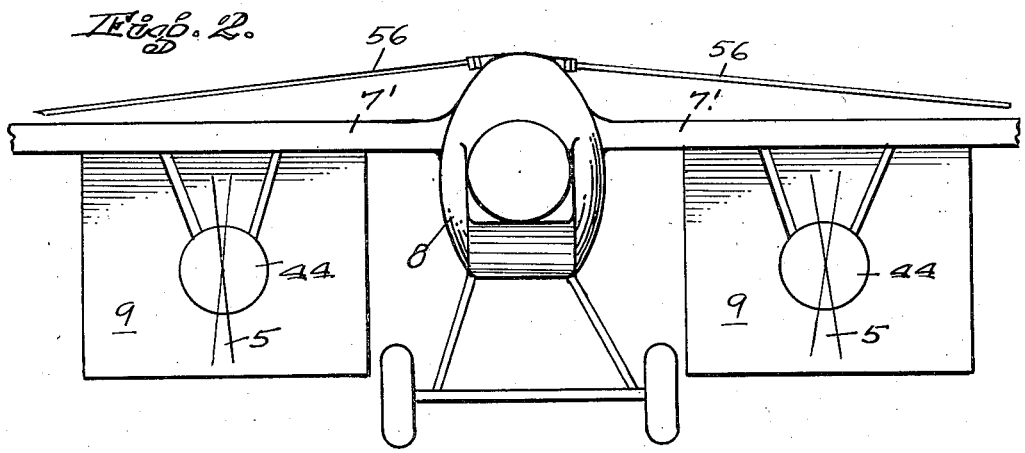
Figure 2 is a somewhat diagrammatic front view of another type of airplane with the lifting surfaces lowered.

In the modified structural embodiment shown in Figure 2, the wings 7 of the airplane 8 are slightly underslung, and longitudinal bracers 56 extend from the top of the fuselage toward the tips of the wings 7 to laterally brace the wings 7 in the usual manner.

I claim:

1. In an aircraft, the combination with wings of the aircraft, of a lifting device comprising, downwardly converging, coacting, continuous panels below said wings being adjustably connected to said wings, propellers on the opposite sides of the coacting panels to force a stream of air against the outside of each panel and entirely below said wings, said panels and said propellers being so positioned that the forced air streams impinging on said panels exert a lifting force on said panels and on said wings, means to move and hold said panels out of and into the planes of said wings respectively into and out of operative positions relative to said propellers, and means to drive said propellers selectively in opposite and in the same directions.

2. A lifting device for airplanes comprising auxiliary wings adjustably extended only downwardly from the main wings of said aircraft, means to force airstreams against opposite faces of said panels at such angles as to exert a lifting force on said panels and on said main wings, means to move and hold said panels into inoperative position in the stream line of the underface of said main wings and into operative positions below said main wings, means to coordinate the said air forcing means for the normal propulsion of said aircraft when said panels are inoperative, and releasable means to fasten each panel in operative position.

3. An auxiliary lifting device for aircrafts comprising foldable auxiliary wings extended from the aircraft so as to provide uninterrupted surface from the sustaining surface of the aircraft to the ends of said auxiliary wings, propellers on the aircraft to drive opposed airstreams against the respective sides of said wings, means to fold and unfold said wings into and out of the path of said airstreams, said wings being so positioned relatively to said propellers that the resultant force of said airstreams exerts a lifting force on said wings and on said aircraft, means to drive said propellers, and means for reversing the direction of rotation of the propellers on one side of said wings so as to coordinate the operation of said propellers to the propulsion of the aircraft when the auxiliary wings are folded, said airstreams being entirely below the respective sustaining surfaces of the aircraft.

4. A lifting device for aircrafts comprising foldable coacting uninterrupted auxiliary surfaces on the aircraft adapted to be extended in inclined planes transversely to the aircraft, means to selectively fold and unfold said surfaces and to cushion the movement of said surfaces during the folding thereof, propellers opposite the outside faces of said auxiliary surfaces; driving means for said propellers adapted to reverse the operation of certain of said propellers so as to coordinate the action of all the propellers for the normal propulsion of the aircraft when said surfaces are folded, and to cause said propellers to work in opposite directions to each other against the opposite sides of said surfaces when said surfaces are unfolded so as to exert a lifting force on said surfaces and on said aircraft, said surfaces being positioned in downwardly converging pairs meeting at an apex when unfolded, and being adapted to be folded upon each other in an out of way position during the normal flight of the aircraft.

5. A lifting device for aircrafts comprising foldable coacting auxiliary surfaces on the aircraft adapted to be extended in inclined planes transversely to the aircraft to be folded within the stream line contour of the aircraft, means to selectively extend and fold said surfaces and to cushion the movement of said surfaces during the folding thereof, propellers opposite the outside faces of said auxiliary surfaces; driving means for said propellers adapted to reverse the operation of certain of said propellers so as to coordinate the action of all the propellers for the normal propulsion of the aircraft when said surfaces are folded, and to cause said propellers to work in opposite directions to each other against the opposite sides of said surfaces when said surfaces are unfolded so as to exert a lifting force on said surfaces and on said aircraft, said surfaces being positioned in downwardly converging position so as to meet at an apex when unfolded and so, as to be continuous from their upper edges to said apex, and being adapted to be folded upon each other in an out of way position during the normal flight of the aircraft, means to fasten said surfaces in an unfolded inclined position, and means for selectively releasing said fastening means.

6. The combination with an airplane having wings thereon forming the main sustaining surface of the airplane, of at least a pair of propellers disposed along each side of the fuselage of the airplane, each pair of propellers being positioned in spaced, opposed relation and one of the propellers of each pair being reversible to work oppositely to the other of said pair, auxiliary wings between the opposed propellers of each pair being normally folded into the underside of said main wings, means to unfold said auxiliary wing downwardly from said main wing so as to form converging surfaces between the opposed propellers of said respective pairs at such angle that the airstreams forced against said auxiliary wings by the respective propellers exert an upward lifting force, the space between each of said propellers and the underside of the main wing being only sufficient to allow rotation, and each of said auxiliary wings being an uninterrupted plane so proportioned as to extend below the line of the lowermost points of said propellers when unfolded, means to fold and unfold said auxiliary wings at will, and means to reverse the operation of one propeller of each pair at will.

7. The combination with an airplane having wings thereon forming the main sustaining surface of the airplane, of at least a pair of propellers disposed along each side of the fuselage of the airplane, each pair of propellers being positioned in spaced, opposed relation and one of the propellers of each pair being reversible to work oppositely to the other of said pair, auxiliary baffle planes between the opposed propellers of each pair being normally folded into the underside of said main planes, means to unfold said auxiliary wings downwardly from said main wing so as to form downwardly converging surfaces between the opposed propellers of said respective pairs at such angle that the airstreams forced against said auxiliary planes by the respective propellers exert an upward lifting force, the space between each of said propellers and the underside of the main wing being only sufficient to allow rotation, and said auxiliary planes being so proportioned as to extend below the lowermost points of said propellers, means engaging the inner face of each auxiliary plane to fold and unfold and cushion said auxiliary wings, and means to reverse the operation of one propeller of each pair at will.

8. The combination with an airplane having wings thereon forming the main sustaining surface of the airplane, of at least a pair of propellers disposed along each side of the fuselage of the airplane, each pair of propellers being positioned in spaced, opposed relation and one of the propellers of each pair being reversible to work oppositely to the other of said pair, auxiliary wings between the opposed propellers of each pair being normally folded into the underside of said main wings, means to unfold said auxiliary wings downwardly from said main wing so as to form converging surfaces between the opposed propellers of said respective pairs at such angle that the airstreams forced against said auxiliary wings by the respective propellers exert an upward lifting force, the space between each of said propellers and the underside of the main wing being only sufficient to allow rotation, and said auxiliary wings being so proportioned as to extend below the line of the lowermost points of said propellers, means engaging the inner face of each auxiliary wing to fold and unfold and cushion said auxiliary wings, means to reverse the operation of one propeller of each pair at will, and means to connect said folding and cushioning means to the inner faces of the respective auxiliary wings so as to allow relative movement between said connection means and said auxiliary wings longitudinally of said auxiliary wings.

9. In an aircraft, the combination with a pair of aligned propellers below the sustaining surface of the aircraft, of a pair of elements, each having continuous, uninterrupted outer surface, means to support said elements between said propellers so that the outer surfaces converge downwardly toward each other and extend from said sustaining surface to below the level of said propellers at an angle to the airflow from said propellers, said elements being foldable into the plane of said sustaining surface of said aircraft.

10. In an aircraft the combination with a pair of aligned propellers below the sustaining surface of the aircraft, of a pair of converging panels between said propellers, each panel being swingably connected at its upper end to said sustaining surface, means to hold said panels in position against the pressure of airflow from said propellers, and means for selectively turning said panels into the plane of said sustaining surface or into said convergent position.

11. In an aircraft the combination with a pair of aligned propellers below the sustaining surface of the aircraft, of a pair of converging panels between said propellers, each panel being swingably connected at its upper end to said sustaining surface, means to hold said panels in position against the pressure of airflow from said propellers, and means within the confines of said sustaining surface for selectively turning said panels into the plane of said sustaining surface or into said convergent position.

12. In an aircraft the combination with a pair of aligned propellers below the sustaining surface of the aircraft, of a pair of converging panels between said propellers, each panel being swingably connected at its upper end to said sustaining surface, means to hold said panels in position against the pressure of airflow from said propellers, and means for selectively turning said panels into the plane of said sustaining surface or into said convergent position, said propellers being adapted to selectively operate in opposite directions to each other or in the same direction.

13. In an aircraft the combination with a pair of aligned propellers below the sustaining surface of the aircraft, of a pair of converging panels between said propellers, each panel being swingably connected at its upper end to said sustaining surface, means to hold said panels in position against the pressure of airflow from said propellers, means for selectively turning said panels into the plane of said sustaining surface or into said convergent position, and slidable means of connection between said turning means and the inside face of each panel.

14. In an airplane the combination with a fuselage and wings extended to each side of the fuselage, a pair of propellers below said wings on each side of the fuselage, each pair being aligned on an axis substantially parallel with the line of flight of the airplane, a pair of converging panels extended downwardly from said wings between each pair of opposed propellers, said panels being adjustably connected at their upper ends to the wings so as to be foldable into the plane of the respective wings at will, means to hold said panels in extended positions against the pressure of airflow created by said propellers, and means to move said panels into and out of operative position at will.

15. In an airplane the combination with a fuselage and wings extended to each side of the fuselage, a pair of propellers below said wings on each side of the fuselage, each pair being aligned on an axis substantially parallel with the line of flight of the airplane, a pair of converging panels extended downwardly from said wings between each pair of opposed propellers, said panels being adjustably connected at their upper ends to the wings so as to be foldable into the plane of the respective wings at will, means to hold said panels in extended positions against the pressure of airflow created by said propellers, and telescoping hydraulic means to move said panels into and out of operative position at will.

16. In an airplane the combination with a fuselage and wings extended to each side of the fuselage, a pair of propellers below said wings on each side of the fuselage, each pair being aligned on an axis substantially parallel with the line of flight of the airplane, a pair of converging panels extended downwardly from said wings between each pair of opposed propellers, said panels being adjustably connected at their upper ends to the wings so as to be foldable into the plane of the respective wings at will, means to hold said panels in extended positions against the pressure of airflow created by said propellers, and means to move said panels into and out of operative position at will, one of each pair of said propellers being selectively rotatable in opposite directions.

17. In an aircraft, the combination with a main sustaining surface, of an auxiliary lifting device comprising downwardly extended auxiliary lifting surfaces adjustably connected to the lower portion of said main sustaining surface, said lifting surfaces extending uninterruptedly throughout from said main sustaining surface, means to direct opposite, forced airstreams against said auxiliary surfaces on the opposite sides of said auxiliary surfaces and entirely below said main sustaining surface, said auxiliary surfaces being so positioned that the resultant force exerted thereon by said streams exerts a lift on said main sustaining surface and on said auxiliary surfaces, means to move said auxiliary surfaces into and out of operative positions and relatively to said main sustaining surfaces, and means to coordinate said air forcing means for the normal propulsion of the aircraft in flight.

ISADORE RUDERMAN.